United States Patent
Lan et al.

(10) Patent No.: US 10,499,204 B1
(45) Date of Patent: Dec. 3, 2019

(54) INTELLIGENT DUPLICATION DETECTION FOR WIRELESS EMERGENCY ALERTS IN DEVICES

(71) Applicant: T-Mobile USA, Inc., Bellevue, WA (US)

(72) Inventors: Wei-Ming Lan, Morrisville, NC (US); Terri Brooks, Prosper, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/283,594

(22) Filed: Feb. 22, 2019

(51) Int. Cl.
*H04W 4/12* (2009.01)
*H04W 88/18* (2009.01)
*H04W 68/00* (2009.01)
*H04L 29/08* (2006.01)
*H04W 4/90* (2018.01)

(52) U.S. Cl.
CPC .......... *H04W 4/12* (2013.01); *H04L 67/2842* (2013.01); *H04W 4/90* (2018.02); *H04W 68/005* (2013.01); *H04W 88/184* (2013.01)

(58) Field of Classification Search
CPC .......... H04W 4/12; H04W 4/14; H04W 4/16; H04W 4/90; H04W 68/005; H04W 88/184; H04L 67/2842
See application file for complete search history.

(56) References Cited

U.S. PATENT DOCUMENTS

| 10,212,570 | B1* | 2/2019 | Ramalingam | H04W 4/70 |
| 2009/0247111 | A1* | 10/2009 | Sennett | H04W 4/90 |
| | | | | 455/404.1 |
| 2010/0075625 | A1* | 3/2010 | Wu | H04W 76/40 |
| | | | | 455/404.1 |
| 2011/0280229 | A1* | 11/2011 | Montemurro | H04W 48/08 |
| | | | | 370/338 |

OTHER PUBLICATIONS

3rd Generation Partnership Project; Technical Specification Group Core Network and Terminals; Technical realization of Cell Broadcast Service (CBS) (Release 15); at <<http://www.3gpp.org>>; 3GPP Organizational Partners; retrieved on Jan. 14, 2019; published 2018; 96 pgs.

* cited by examiner

Primary Examiner — Dinh Nguyen
(74) Attorney, Agent, or Firm — Lee & Hayes, P.C.

(57) ABSTRACT

Cellular communication networks may be configured to broadcast wireless emergency alert (WEA) messages to multiple receiving communication devices. A communication device has physical-layer components, such as a modem subsystem, that receive broadcast alert messages. The modem subsystem uses a cache to record received alert messages and references the cache to perform duplication checking for newly received messages. Newly received messages that are not duplicates are provided to application-layer software for further processing. The application-layer software notifies a device user of the alert message if the alert message satisfies certain criteria. In addition, the appli- (Continued)

cation-layer detects changes in device properties that could potentially affect the criteria and in response causes the cache of the modem subsystem to be cleared so that the modem subsystem will not declare a subsequently received alert message to be a duplicate.

20 Claims, 3 Drawing Sheets

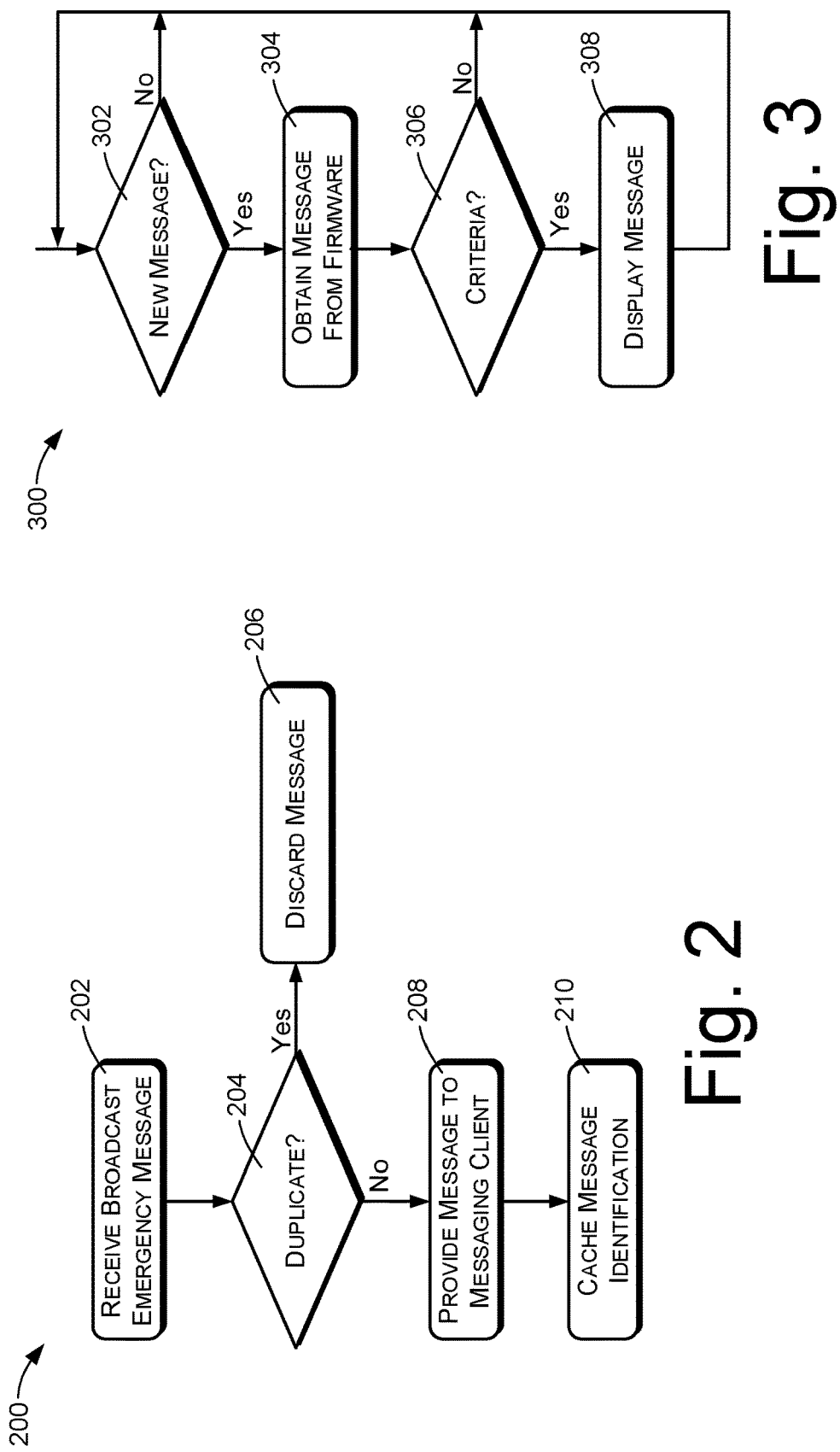

INTELLIGENT DUPLICATION DETECTION FOR WIRELESS EMERGENCY ALERTS IN DEVICES

BACKGROUND

The Wireless Emergency Alert (WEA) system has been established for broadcasting alert messages to wireless communication devices. Alert messages may be generated by local, state, and national agencies such as emergency management authorities, law enforcement agencies, weather services, etc.

Alert messages can be specific to different geographic regions and may contain textual warnings regarding immediate hazards in those regions such as tornadoes, thunderstorms, flash floods, hurricanes, typhoons, and other serious weather-related events. Alert messages may also give instructions, such as evacuation notices. Alert messages may also be issued regarding missing persons (e.g., AMBER alerts). Alert messages may include "Presidential" alerts regarding national emergencies. Presentation of the alert to the mobile user includes display of the alert text, audible alerting, and vibration (visual, auditory, touch). An alert may display information regarding the type of the alert, any actions that should be taken, and the agency that has issued the alert.

A user of a wireless communication device can decline to receive certain types of WEA alerts. A communication device that supports WEA messages may include configuration settings, accessible through a graphical user interface (GUI), that allows the user to enable or disable the different message types.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a flow diagram illustrating an example method that may be performed by firmware of a cellular communication device when receiving Wireless Emergency Alert (WEA) messages FIG. 3 is a flow diagram illustrating an example method that may be performed by a messaging client of the cellular communication device to process received WEA messages.

DETAILED DESCRIPTION

Figure 1:
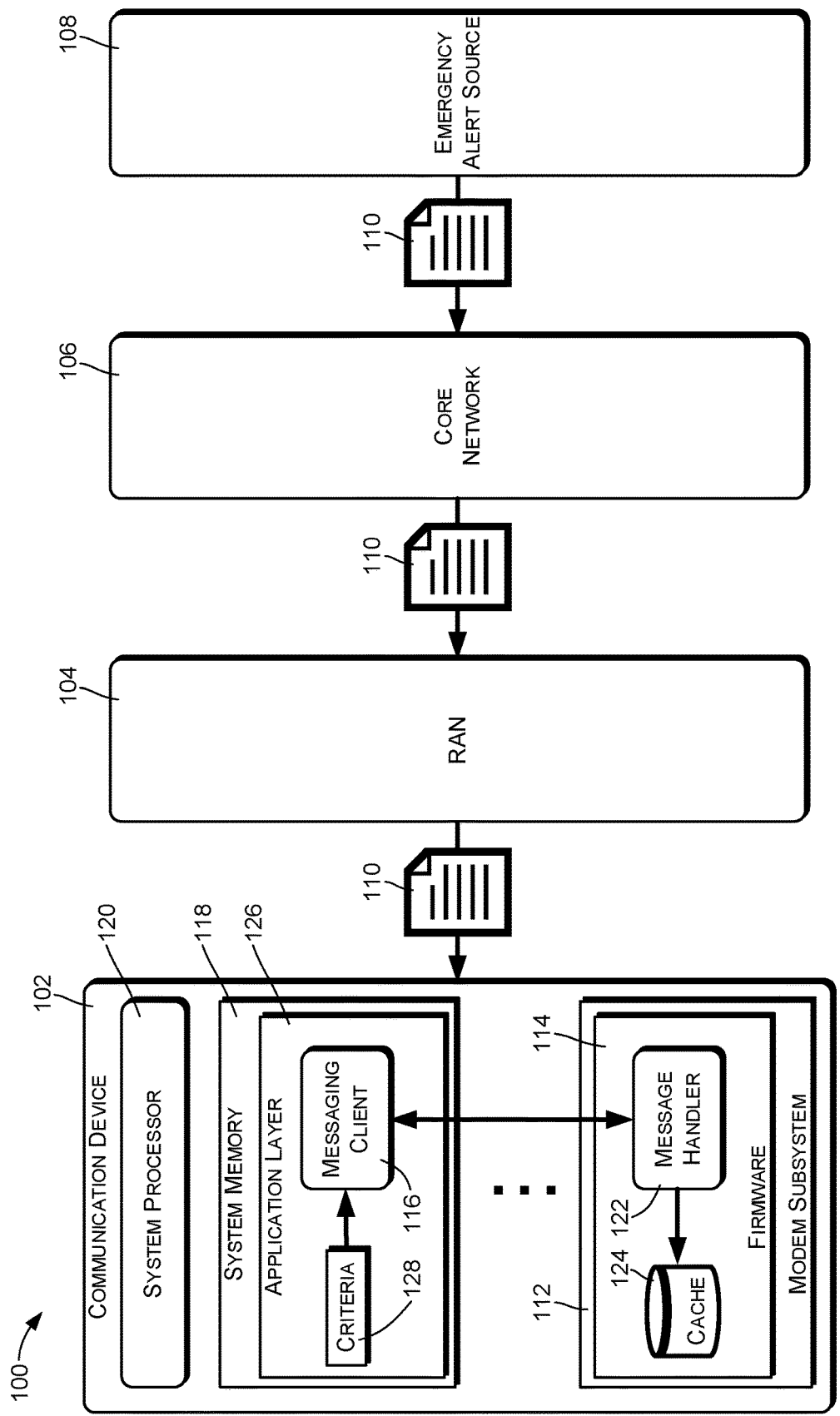
FIG. 1 is a block diagram illustrating relevant components of an environment in which the described techniques may be implemented.

Techniques described herein may be used by wireless communication devices to handle Wireless Emergency Alert (WEA) messages. In particular, the described techniques can be used to suppress the repeated display of the same alert, while also ensuring that all appropriate alerts are presented to a user at least once.

In accordance with embodiments described herein, a WEA system repeatedly broadcasts emergency alert messages via multiple cells of a cellular communication network. Each message has metadata that includes a unique Message Identifier (ID), a Serial Number, a time, a language, a designation of a geographic area of alert applicability, and alert text. Each message is typically rebroadcast repeatedly and/or periodically, as determined by Operator Policy, to ensure that as many users as possible receive the message. For example, certain types of alerts may be sent at intervals of 5 minutes, while other types of alerts, regarding more imminent threats, may be rebroadcast more frequently.

WEA messages are initially received by lower-level components of a wireless communication device, such as by the modem or modem subsystem of the device, and are then passed to higher-level logic such as a WEA messaging client that resides at the application layer of the device software architecture. The WEA messaging client comprises software that is responsible for presenting the alert notifications and messages to the user, in accordance with WEA configuration settings by the user. For example, the user may "opt out", or disable, the presentation of alerts (with the exception of Presidential Alerts). The user may also select a language in addition to English for the display of the alert.

To save battery life, the modem subsystem performs duplication checking, and discards duplicate WEA messages without providing them again to the WEA messaging client. When a WEA message is received, the modem subsystem caches a message identification corresponding to the message. In certain embodiments, the message identification may comprise a combination of the Message ID and Serial Number of the message. These two Information Elements (IEs) together form a unique ID for an active alert. When a new message is received, the modem subsystem checks the message identification of the message against the IEs cached from previous messages to determine whether the new message is a duplicate. If it is not, the message is forwarded to the WEA messaging client.

The WEA messaging client filters forwarded messages in accordance with the user configuration settings and/or device conditions. Specifically, the WEA messaging client presents an alert only if the message meets certain criteria. For example, the device may be configured to display WEA messages only if the user has not opted out of WEA messaging. As another example, the device may be configured to only display WEA messages of a certain type, as indicated by device configuration settings. WEA message types include, but are not limited to, (a) alerts issued by the President of the United States, (b) alerts involving imminent threats to safety, and (c) AMBER alerts regarding missing children.

As another example, the device may be updated to comply with WEA 3.0, which provides for presentation of an alert only if the device is within a geographic area specified by the message (referred to herein as an alert area), or in the case that location cannot be obtained. This allows messages to be targeted to relevant areas, preventing over-alerting to users not considered close enough to receive the alert presentation. For example, a tornado warning might be relevant only to device users who are in a particular geographic area, and does not need to be presented to other users.

As another example, the device may be configured to display only messages that are in a certain language or in certain languages. In systems supporting WEA 2.0 or later, alerts may be sent in multiple languages. A user configuration setting is used to specify one or more preferred languages of the user. The configuration setting is then used to determine which messages to present. In some cases, for example, the user may specify English as a preferred language, and only messages that are in English will be displayed. In some cases, a user may specify another language, and only messages in that language will be displayed. In some cases, messages in a default language may be displayed regardless of language settings, and messages in another language, designated by a user, may be presented in addition to the default-language messages.

The filtering of messages in this way may not always result in the desired behavior. For example, there may be situations in which a user has initially opted out of WEA messages, but then opts in after a broadcast of the message has already been received and the unique combination of Message ID and Serial Number has been cached by the modem subsystem. In this case, the duplication checking performed by the modem subsystem prevents subsequent rebroadcasts of the message from being forwarded to the WEA messaging client, and the message therefore will not be presented to the user.

As another example, there may be situations in which a user changes the WEA language settings of a device after a broadcast of a WEA message has been received and its message identification cached by the modem subsystem. In this case, it would be desirable for the device to subsequently present any rebroadcasts of the message appropriately based on the new language settings. However, because of duplication checking performed by the modem subsystem, rebroadcasts of the message will not be forwarded to the WEA messaging client. Accordingly, the message will not be processed by the WEA messaging client and will not be presented according to the new language settings.

As another example, there may be situations in which a user is not initially within the alert area specified by a received WEA message. In this case, it would be desirable for the device to then present a rebroadcast message because the user has moved into the alert area. However, the message will have been previously received and its message identification will have been cached by the modem subsystem so that subsequent rebroadcasts of the message will not be forwarded to the WEA messaging client. Because of this, the message will not be presented when the user enters the designated alert area.

To address these issues, the WEA messaging client can be configured to detect changes in conditions or user settings that might affect the criteria used for selecting messages for presentation. Some examples using the above-mentioned settings would be that the WEA messaging client and/or associated software can be configured to detect that (a) the device user has changed device settings to enable WEA messaging, (b) the device user has changed the device settings to indicate a different language, and/or (c) that the device has moved into a new or different geographic area. In response to these changes or other changes, the WEA messaging client instructs the modem subsystem to clear its cache of previously received message identifications. This effectively resets the duplication checking of the modem subsystem so that any newly received alert message will not be identified as a duplicate and will therefore be forwarded to the WEA messaging client for potential presentation to the user in accordance with current WEA user settings and other conditions.

The described techniques provide an efficient way to ensure that appropriate emergency alert messages are presented to a user of a cellular communication device, without requiring significant changes in software, firmware, or hardware of the communication device.

FIG. 1 illustrates an example environment 100 within which certain techniques described herein may be implemented. In FIG. 1, a mobile communication device 102, also referred to as user equipment (UE) 102 or as a mobile station (MS) 102, communicates through a radio access network (RAN) 104 with a core network 106 of a cellular communication system.

The UE 102 may comprise any type of device capable of wireless communication with the core network 106 and/or other components. For example, the UE 102 may comprise a cell phone, a smartphone, a computer, a tablet computer, or any other device capable of presenting emergency alert messages and associated messages. The UE 102 is an example of many such devices that may be used within a wireless communication network.

The RAN 104 may use any type of wireless communication technology, including $3^{rd}$-Generation (3G), $4^{th}$-Generation (4G), and $5^{th}$-Generation radio access technologies. For example, the RAN 104 may be implemented by a 3G, 4G, or 5G base station or access point. The RAN 104 typically comprises multiple base stations distributed over a large geographic region, such as a country, to serve many devices.

The core network 106 may comprise, as examples, a Long-Term Evolution (LTE) network or a 5G network. The techniques described herein may also be useful in conjunction other types of networks, such as Universal Mobile Telecommunications Service (UMTS) and Global System for Mobile communications (GSM) networks.

The environment 100 includes an emergency alert source 108 that provides emergency alert messages, of which a single emergency alert message 110 is shown in FIG. 1. The emergency alert source 108 provides the emergency alert messages to the core network 106 for eventual one-way broadcast over the RAN 104 to receiving devices such as the UE 102. In the described embodiment, the emergency alert messages comprise wireless emergency alert (WEA) messages that are broadcast using standards and techniques that have been established for this purpose.

The emergency alert source 108 may include several components and entities. Alert messages are initially generated by alerting authorities and provided to a message aggregator. The message aggregator receives alert messages from multiple alerting authorities and forwards the messages to multiple alert disseminators such as various wireless communication providers. The wireless communication providers broadcast the messages via their core networks 106 and RANs 104. Multiple UEs 102 receive the one-way message transmissions and display the specified messages, if appropriate in light of device configuration settings and conditions. An individual emergency alert message may be broadcast repeatedly until the message is no longer relevant. Multiple broadcasts of the message ensure that the message is received by as many UEs 102 as possible.

In the described environment, the emergency alert message 110 includes various metadata. Metadata may include, for example, a unique identifier (ID) of the message 110. Metadata may also include a serial number of the message 110. Metadata may indicate a geographic region of relevance so that devices outside that region can ignore the message 110. The message also includes the message text that is to be displayed by receiving communication devices.

The alert message 110 is distributed through the core network 106 and the RAN 104 to multiple UEs 102. When the UE 102 receives the alert message 110, the UE 102 determines whether the alert message 110 should be displayed based on properties such as configuration settings of the UE 102 and the location of the UE 102. Configuration settings may be available to enable or disable emergency alert messages on the UE 102, for example. As another example, configuration settings may be available for selecting certain types of emergency alert messages to receive.

The UE 102 may also use the location of the UE 102 when determining whether to display the received emergency alert message 110. Specifically, the current location of the UE 102 can be compared to a geographic region of relevance specified by the metadata of the alert message 110. The UE 102 displays the received alert message 110 only if the UE 102 is currently within the specified geographic region of relevance.

The alert message 110 is initially received and processed by a physical-layer component of the UE 102, such as a modem subsystem 112. Note that the initial reception of the alert message 110 by the UE 102 may not correspond to the first transmission of the alert message 110 by the RAN 104.

The modem subsystem 112 has firmware 114 that controls the operation of the modem subsystem 112. Generally, firmware is logic that is associated with, implemented by, and/or executed by specific hardware, such as logic that is embedded within a hardware component.

In certain embodiments, the modem subsystem 112 may be implemented by one or more integrated circuits or by a System-on-a-Chip (SoC) for mobile devices. The firmware 114 of the modem subsystem 112 includes logic for processing RF signals, implementing communication protocols such as LTE and 5G, for performing carrier aggregation, for controlling operations of RF components, RF Integrated Circuits (RFICs), and RF Front Ends (RFFEs) with respect to signals to and from a base station, for interfacing with higher-level software components, etc. As will be described in more detail below, the modem subsystem 112 also performs initial processing of broadcast emergency alert messages.

The firmware 114 of the modem subsystem 112 initially receives broadcast emergency alert messages, performs duplication checking, and forwards any new, non-duplicate messages to a WEA messaging client 116 that resides at the application layer 126 of the device software architecture. More specifically, the firmware 114 has functionality, referred to herein as a firmware message handler 122, that receives and processes broadcast emergency alert messages such as the alert message 110. The firmware message handler 122 uses a firmware message cache 124 to record received messages for duplication checking. The message cache 124 may comprise a data structure in memory of the firmware, where the data structure contains message metadata and/or message text.

When a message is received, the firmware message handler 122 compares the received message to messages that have been previously recorded in the firmware message cache 124 to determine whether the new message is a duplicate of a previously received and processed message. Any non-duplicate messages are forwarded to the WEA messaging client 116 and also stored in the firmware message cache 124 for future reference.

In certain embodiments, recently received messages may be recorded in the firmware message cache 124 by storing message identifications corresponding to the messages. A message identification for an individual alert message may comprise Message Identifiers (IDs) and a Serial Number. The alert text (or message content) can also be stored in the firmware message cache 124 and used for comparison with newly received messages to provide further reliability when checking for duplicate messages.

The WEA messaging client 116 implements functionality for processing emergency alert messages received from or made available by the firmware 114. The WEA messaging client 116 may be referred herein at times as a system message handler. The WEA messaging client 116 uses message criteria 128 to determine whether to display received alert messages. The criteria may be based on device conditions, device configuration settings, and/or other device properties. When the alert message 110 is received from the firmware message handler 122, the WEA messaging client 116 evaluates the message criteria 128, based on metadata of the alert message 110, to determine whether to provide a notification regarding the alert message 110. If the message criteria 128 are satisfied by the message metadata, the WEA messaging client 116 presents a notification on the UE 102 for viewing by a user of the UE 102. For example, the WEA messaging client 116 may generate a notification on a display of the UE 102. In some cases, the notification may include the text of the alert message 110. In other cases, the notification may be designed so that the text is seen in response to a user selection of the notification or of an element within the notification. The WEA messaging client 116 may also generate an audible notification.

In some cases, the WEA messaging client 116 may also perform duplication checking to provide further protection against multiple notifications for a single emergency alert message.

FIG. 2 illustrates an example method 200 that may be performed by the firmware message handler 122 for processing wireless emergency alert (WEA) messages, such as the alert message 110 of FIG. 1. In some embodiments, the method 200 may be performed by the firmware 114 of the modem subsystem 112 or by other physical layer components of the UE 102, which in turn may be implemented by one or more integrated circuits or by a System-on-a-Chip (SoC).

An action 202 comprises receiving the broadcast emergency alert message 110. In some implementations, the alert message may be broadcast and received as a Cell Broadcast (CB) message of a CB System (CBS), in accordance with the 3GPP specification TS 23.041. A CBS is a messaging system that allows simultaneous delivery of an unacknowledged message to multiple UEs that are within a geographic cell broadcast area that is specified by the message.

An action 204 comprises determining whether the received alert message 110 is a duplicate of a previously received alert message. For example, the action 204 may comprise referencing one or more message identifications stored in the firmware message cache 124 to determine whether the alert message has been previously received. As described above, the message identifications correspond to previously received alert messages.

In some embodiments, an individual message identification may comprise one or more items of message metadata, such as a combination of a message identifier (ID) and/or a message serial number. In these embodiments, the action 204 may comprise determining whether these metadata items of the received alert message match those of any previously received alert messages. In some embodiments, a message identification of an alert message may also, or alternatively, comprise the text of the message, and the action 204 may include comparing the text of the received message to the text of previously received messages. Messages with different message text are not considered to be duplicates.

If in the action 204 it is determined that the received alert message is a duplicate, an action 206 is performed of discarding the received message, without storing or adding it to the firmware message cache 124 and without forwarding it to the WEA messaging client 116.

Actions 208 and 210 are performed in response to determining that the received alert message has not been previously received and is not a duplicate of another, previously received message that has been recorded in the firmware message cache 124.

The action 208 comprises providing the received alert message for further processing by the WEA messaging client 116. In some embodiments, the alert message may be forwarded to the WEA messaging client 116 using application programming interfaces (APIs). In other embodiments, the alert message may be forwarded by storing it to a common area of system memory 118, from which it can be retrieved by the WEA messaging client 116.

The action 210 comprises storing an identification of the received alert message in the firmware message cache 124, to be used for subsequent duplication checking. The message identification may comprise message metadata such as a message ID, serial number, etc. In some embodiments, the message identification may also, or alternatively, comprise the text of the received alert message.

FIG. 3 illustrates an example method 300 that may be performed by a software component such as the WEA messaging client 116 for processing wireless emergency alert messages.

An action 302 comprises determining whether there is a new alert message available. For example, the action 302 may comprise receiving a notification or other communication from the firmware message handler 122. Alternatively, the action 302 may comprise detecting the presence of a new alert message in a shared memory area in which the alert message has been stored by the firmware message handler 122.

An action 304 comprises obtaining the alert message from the firmware message handler 122. The action 304 may comprise receiving the alert message in a communication from the firmware message handler 122. Alternatively, the action 304 may comprise reading the alert message from a shared memory area in which the alert message has been stored by the firmware message handler 122.

An action 306 comprises determining whether the alert message satisfies one or more criteria. These criteria may be based on configuration settings of the UE 102, including configuration settings relating to alert messaging. For example, one criterion might be that the user has not opted out of receiving alert messages or notifications. As another example, another criterion may be that the alert message is in a language that has been specified by a configuration setting to be used by the UE 102. As another example, another criterion may be that the alert message is specified as being for a geographic region that includes the current location of the UE 102.

An action 308 is performed in response to determining that the alert messages satisfies the one or more criteria. The action 308 comprises presenting a notification on the UE 102 regarding the received alert message. The notification may be a visible notification, an audible notification, or a vibratory notification, for example. In some embodiments, the notification may include displaying the text of the alert message. In other embodiments, the device user may need to select or otherwise open the notification in order to see the message text.

If the alert message does not satisfy the one or more criteria, the action 308 is not performed and the WEA messaging client 116 refrains from displaying the alert message and/or from providing a notification regarding the alert message.

Figure 4:
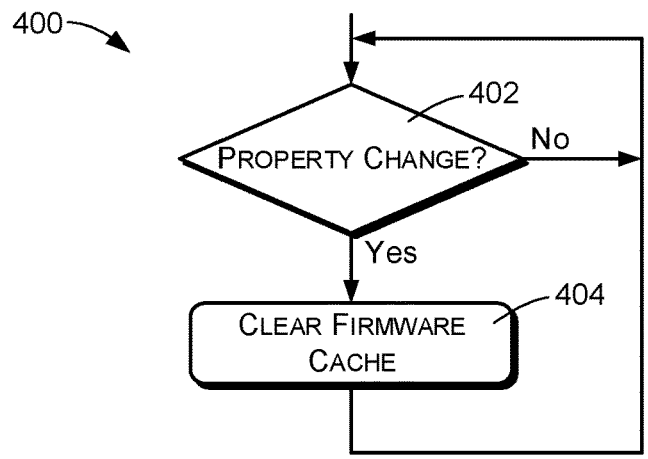
FIG. 4 is a flow diagram of an example method that may be performed by the messaging client of the cellular communication device to reset message duplicating checking by the firmware.

FIG. 4 illustrates an example method 400 that may also be performed by the WEA messaging client 116 for handling wireless emergency alert messages. The method 400 may be performed by the WEA messaging client 116 in parallel with or in conjunction with the method 300. The method 400 is performed continuously or periodically to monitor for device changes that might affect the criteria used for determining whether to generate notifications regarding alert messages.

An action 402 comprises detecting a change in one or more properties of the UE 102, where the change is one that affects the criteria 128 used in the action 308. In some cases, the properties may comprise configuration settings, such as a configuration setting for enabling and disabling emergency alert notifications on the UE 102. As another example, one of the configuration settings might be for designating the language used by the device for presenting user interface information such as alert notifications. As another example, the UE 102 may have one or more configuration settings regarding how alerts are displayed and/or which parts of an alert message (e.g., graphics, hyperlinks, maps, text-only, etc.) are displayed. More generally, the properties considered in the action 402 may include any settings or other properties relating to the display of alert messages.

In certain embodiments, the properties may include the current location of the UE 102, as determined by a global positioning satellite (GPS) receiver, by various types of geolocation, by configuration settings, by recently cached locations, etc. In some cases, movement of the UE 102 from one region to another may be detected automatically, without specific user action. In some cases, a configuration setting may allow a user to specify their current or default location and to specify location changes. In some cases, location changes may be detected by noting the movement of the UE 102 into a new cell, a new cell sector, or a new network, and/or by noting significant changes in signal strength within a cell. Geolocation techniques may determine location based on Internet Protocol (IP) addresses, Wi-Fi position detection techniques, broadcast data from cell towers, etc. Generally, location of the UE 102 may be determined using any appropriate means.

An action 404 is performed in response to detecting the change in the one or more properties. The action 404 comprises clearing the firmware message cache 124, such as by causing the firmware message cache 124 to be cleared of all of its cached message identifications. The action 404 effectively resets the duplication checking performed by the firmware message handler 122, so that the firmware message handler 122 does not determine that newly received WEA messages are duplicates.

Figure 5:
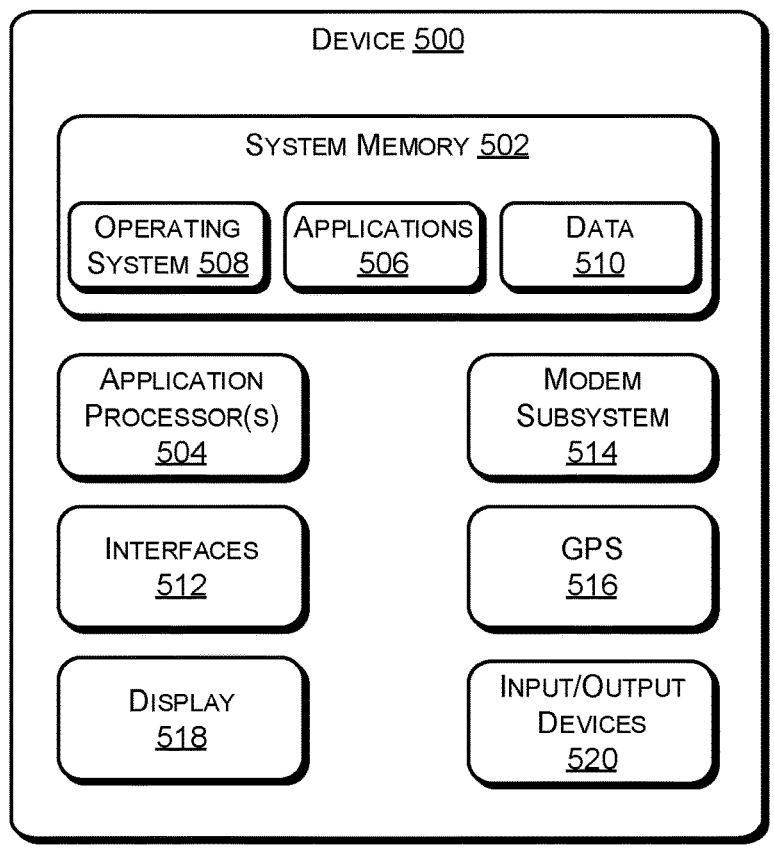
FIG. 5 is a block diagram of an example communication device 500 that may be configured to implement the techniques described herein.

FIG. 5 illustrates an example cellular communication device 500 that may be used to implement the techniques described herein. The methods of FIGS. 2-4, for example, may be implemented by a device such as the device 500. The device 500 is an example of the UE 102, illustrating additional high-level components that are not shown in FIG. 1.

The device 500 includes system memory 502 and an application processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, which can be used to store the desired information. The memory 502 may in some cases include storage media used to transfer or distribute instructions, applications, and/or data. The memory of the device 500 may also include memory of various hardware components of the device such as modem subsystems.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510. The WEA messaging client 116 may be implemented as part of the application 506, OS 508, or other software stored by the memory 502. The data 510 may include the criteria 128 that is used to determine whether to display notifications for emergency alert messages.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may have interfaces 512, which may comprise any sort of interfaces known in the art. The interfaces 512 may include a Wi-Fi interface and/or a Bluetooth interface that performs the function of transmitting and receiving wireless communications using, for example, the IEEE 802.11, standards. The interfaces 512 may include a near field interface, which may comprise a Bluetooth® interface or radio frequency identifier (RFID) for transmitting and receiving near field radio communications via a near field antenna. For example, a near field interface may be used for functions, as is known in the art, such as communicating directly with nearby devices that are also, for instance, Bluetooth® or RFID enabled.

The device 500 may have a modem subsystem 514 for implementing wireless communication protocols such as Long-Term Evolution (LTE) and 5G New Radio (NR) radio access technologies. In some embodiments, the modem subsystem may be part of a System-on-a-Chip or may be implemented on one or more integrated circuits along with other cellular communication functionality.

The device 500 may have a global positioning system (GPS) receiver 516 used to determine the current location of the device 500 at any time.

The device 500 may have a display 518, which may comprise a liquid crystal display or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have various input and output devices 520. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by a wireless communication device, wherein the wireless communication device includes a firmware message handler and a messaging client, the method comprising:
   by the firmware message handler:
      receiving a first emergency alert message;
      referencing a cache of one or more message identifications corresponding respectively to one or more previously received emergency alert messages to determine whether the first emergency alert message has been previously received; and
      in response to determining that the first emergency alert message has not been previously received, (a) storing a message identification of the first emergency alert message in the cache and (b) providing the first emergency alert message for further processing by the messaging client;
   by the messaging client:
      determining that the first emergency alert message satisfies one or more criteria;
      in response to determining that the first emergency alert message satisfies the one or more criteria, providing a notification of the first emergency alert message;
      detecting a change in a configuration setting that affects at least one of the one or more criteria; and
      in response to detecting the change in the configuration setting, causing the cache to be cleared of at least one of the one or more message identifications so that a subsequently received second emergency alert message is not determined by the firmware message handler to have been previously received.

2. The method of claim 1, wherein providing the notification comprises displaying the first emergency alert message.

3. The method of claim 1, wherein the configuration setting is for enabling emergency alert notifications on the wireless communication device.

4. The method of claim 1, wherein the configuration setting is for designating a language to be used by the wireless communication device.

5. The method of claim 1, wherein the firmware message handler is implemented by a modem subsystem of the wireless communication device.

6. The method of claim 1, wherein the firmware message handler is implemented by a physical layer component of the wireless communication device.

7. A method performed by a wireless communication device, the method comprising:

receiving a first broadcast wireless emergency alert message;
referencing a cache of one or more message identifications corresponding respectively to one or more previously received wireless emergency alert messages to determine whether the first broadcast wireless emergency alert message duplicates any of the one or more previously received wireless emergency alert messages;
in response to determining that the first broadcast wireless emergency alert message does not duplicates any of the one or more previously received wireless emergency alert messages, determining whether the first broadcast wireless emergency alert message satisfies one or more criteria;
in response to determining that the first broadcast wireless emergency alert message satisfies the one or more criteria, providing a notification of the first broadcast wireless emergency alert message on the wireless communication device;
detecting a change in a property of the wireless communication device, wherein the change in the property affects the one or more criteria; and
in response to detecting the change in the property of the wireless communication device, causing the cache to be cleared of at least one of the one or more message identifications so that a newly received wireless emergency alert message is not determined to be a duplicate.

8. The method of claim 7, wherein the property comprises a location.

9. The method of claim 7, wherein the property comprises a configuration setting.

10. The method of claim 7, wherein the property comprises a configuration setting for enabling emergency alert notifications on the wireless communication device.

11. The method of claim 7, wherein the property comprises a configuration setting for designating a language to be used by the wireless communication device.

12. The method of claim 7, wherein causing the cache to be cleared of at least one of the one or more message identifications comprises removing all of the one or more message identifications from the cache.

13. The method of claim 7, further comprising:
receiving a second broadcast wireless emergency alert message;
referencing the cache to determine whether the second broadcast wireless emergency alert message duplicates any of the one or more previously received wireless emergency alert messages; and
in response to determining that the second broadcast wireless emergency alert message duplicates any of the one or more previously received wireless emergency alert messages, refraining from providing a notification of the second broadcast wireless emergency alert message on the wireless communication device.

14. A communication device, comprising:
one or more processors;
one or more integrated circuits, the one or more integrated circuits being configured to perform first actions comprising:
receiving a broadcast emergency alert message;
referencing a cache of one or more message identifications corresponding respectively to one or more previously received emergency alert messages to determine whether the broadcast emergency alert message duplicates any of the one or more previously received emergency alert messages; and
in response to determining that the broadcast emergency alert message does not duplicate any of the one or more previously received emergency alert messages, providing the broadcast emergency alert message for processing; and
one or more non-transitory computer-readable media storing computer-executable instructions that, when executed by the one or more processors, cause the one or more processors to perform actions comprising:
in response to the providing of the broadcast emergency alert message for processing, determining that the broadcast emergency alert message satisfies one or more criteria;
in response to determining that the broadcast emergency alert message satisfies the one or more criteria, providing a notification of the broadcast emergency alert message on the communication device;
detecting a change in a property of the communication device, wherein the change in the property affects the one or more criteria; and
in response to detecting the change in the property of the communication device, causing the cache to be cleared so that a newly received emergency alert message is not determined to be a duplicate.

15. The communication device of claim 14, wherein the one or more integrated circuits comprise a modem subsystem.

16. The communication device of claim 14, wherein the one or more integrated circuits comprise a device System-on-a-Chip (SoC) for mobile devices.

17. The communication device of claim 14, wherein the property comprises a location.

18. The communication device of claim 14, wherein the property comprises a configuration setting for enabling emergency alert notifications on the communication device.

19. The communication device of claim 14, wherein the property comprises a configuration setting for designating a language to be used by the communication device.

20. The communication device of claim 14, wherein causing the cache to be cleared of at least one of the one or more message identifications comprises removing all of the one or more message identifications from the cache.

* * * * *